T. H. NEAL.
Car-Wheels.

No. 154,890.

Patented Sept. 8, 1874.

Witnesses:
L. F. Brous.
A. P. Grant.

Inventor:
Thomas H. Neal
by John A. Wiedersheim
Atty.

UNITED STATES PATENT OFFICE.

THOMAS H. NEAL, OF PHILADELPHIA, PENNSYLVANIA, ASSIGNOR OF ONE-HALF HIS RIGHT TO MARCUS F. RICHARDSON, OF SAME PLACE.

IMPROVEMENT IN CAR-WHEELS.

Specification forming part of Letters Patent No. 154,890, dated September 8, 1874; application filed July 22, 1874.

*To all whom it may concern:*

Be it known that I, THOMAS H. NEAL, of the city and county of Philadelphia and the State of Pennsylvania, have invented a new and useful Improvement in Car-Wheels; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
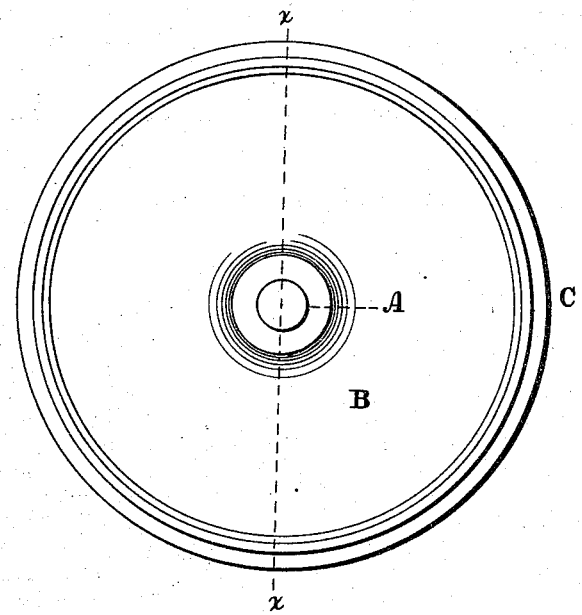
Figure 2:
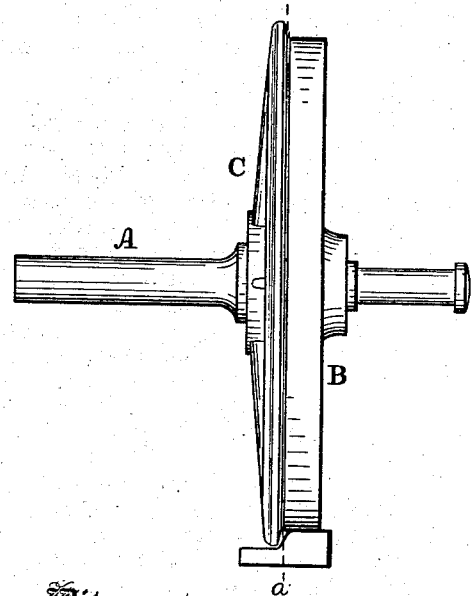
Figure 3:
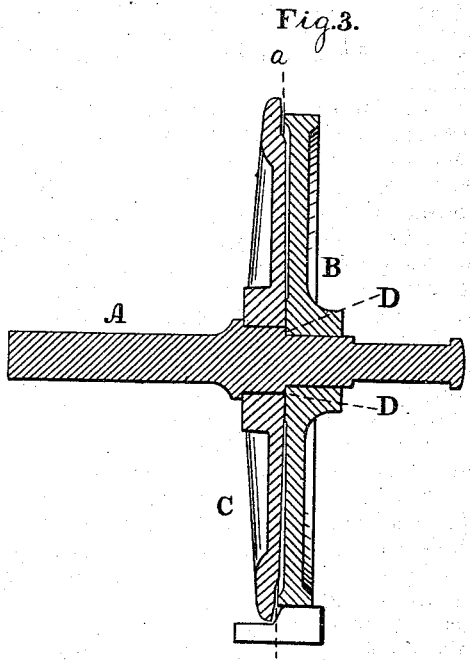

Figure 1 is a face view of the device embodying my invention. Fig. 2 is a side view thereof. Fig. 3 is a central section in line $x$ $x$, Fig. 1.

Similar letters of reference indicate corresponding parts in the several figures.

My invention relates to a car-wheel especially designed for purposes of street-cars, wherein the tread and flange have independent motions; and it consists in the said tread and flange, constructed of two disks, which are arranged parallel to each other on the same axle, but not in contact, the tread being firmly keyed to the axle, and the flange fitted loosely thereon, the inner faces of the tread and flange separating, and the axle having shoulders, against which one side of the tread has a bearing, whereby the freedom of contact of the tread and flange is preserved at all times, and the wheel runs with less friction, greater ease, and less wear.

Referring to the drawings, A represents an axle, on which is keyed or otherwise firmly secured a disk, B, whose surface constitutes the tread portion of the wheel. C represents a disk, which is fitted loosely on the axle A, arranged parallel with the disk B, and has a diameter greater than that of said disk B, so that its surface projects beyond the surface of the disk B, and thus constitutes the flange of the wheel. The diameter of the axle A, at the portion occupied by the tread B is less than that of the portion occupied by the flange C, so that there is formed on the axle a shoulder, D, against which the tread B comes to a bearing in one direction laterally.

The inner or adjacent faces of the tread and flange separate so as not to be in contact, and thus the flange and tread are entirely disconnected.

When the car is going forward on the track and the flange strikes the bottom or base portion thereof, stones, or other obstructions, the flange receives rotation thereby, without causing the tread to drag on the rail, since the flange has a motion independent of the tread, and thus in no wise interferes with the motion of the tread. This provision prevents increase in the speed of the wheel on the side where the flange strikes bottom or obstructions, as stated, and overcomes the tendency of the cars running off the track. There is also prevented the grinding or wearing away of the tread which occurs where the tread and flange are united or in contact.

In running around a curve the tread portion of the wheel on the inner rail bears against said rail and rotates thereon. The flange portion of the same wheel offers no resistance to the rotation of the tread, or is prevented from rotating as it makes its angles with the rail, since there is no friction between the tread and flange, these parts being entirely separated, as has been stated. The flange portion of the wheel on the outer rail also freely rotates, and thus does not interfere with the free passage of the tread of the wheel on said outer rail, whereby the cars move around curves with greatly decreased friction.

In cases where the flange runs directly on the outer rail of a curve, its resistance is not communicated to the tread of the wheel on the inner rail, since the treads of the wheel on both the inner and outer rails move together in harmony, but entirely independent of the flange of the wheel on the outer rail.

It is evident the shoulder D serves as a stop to the encroachment of the tread portion on the inner face of the flange portion, and, owing to the separated faces of said portions, the disconnection thereof is insured at all times, regardless of lateral strain, so that the independence of the two portions is maintained.

I am aware that it is not new to construct a car-wheel of two parallel disks, one of which constitutes the tread and the other constitutes the flange, the two parts having motions independent of each other, and therefore lay no claim thereto.

Having thus described my invention, what I claim as new, and desire to secure by Letters Patent, is—

The tread-disk B, fitted to the axle A, and flange-disk C, fitted loosely thereon, the two disks being independent of each other, in combination with the axle A, formed with a shoulder, D, against which the fixed disk B has a lateral bearing, all constructed to operate substantially as and for the purpose set forth.

THOMAS H. NEAL.

Witnesses:
JOHN A. WIEDERSHEIM,
M. F. RICHARDSON.